United States Patent
Knoebel

(10) Patent No.: US 7,641,206 B2
(45) Date of Patent: Jan. 5, 2010

(54) MATERIAL-HANDLING DEVICE

(76) Inventor: Norwood B. Knoebel, 342 Tonny Penna, No. 5, Jupiter, FL (US) 33458

( * ) Notice: Subject to any disclaimer, the term of this patent is extended or adjusted under 35 U.S.C. 154(b) by 425 days.

(21) Appl. No.: 11/560,711

(22) Filed: Nov. 16, 2006

(65) Prior Publication Data

US 2008/0116650 A1    May 22, 2008

(51) Int. Cl.
  B62B 1/00    (2006.01)
  B62B 3/00    (2006.01)
  B62B 7/00    (2006.01)
(52) U.S. Cl. .................. 280/47.34; 280/651; 280/653; 280/654; 280/659; 280/47.131
(58) Field of Classification Search .......... 280/651, 280/653, 654, 659, 43.12, 43.1, 47.31, 47.315, 280/47.34, 47.36, 47.131
See application file for complete search history.

(56) References Cited

U.S. PATENT DOCUMENTS

| | | | | |
|---|---|---|---|---|
| 2,037,222 A | * | 4/1936 | Farrar | 298/3 |
| 2,852,304 A | * | 9/1958 | Harrison | 298/3 |
| 2,880,431 A | * | 4/1959 | Noland | 14/72.5 |
| 3,017,710 A | * | 1/1962 | Carlson | 37/434 |
| 3,166,339 A | * | 1/1965 | Earley | 280/654 |
| 3,661,414 A | * | 5/1972 | Roth | 294/59 |
| 4,343,487 A | * | 8/1982 | Crothers | 280/654 |
| 5,088,751 A | | 2/1992 | Zint | |
| 5,876,049 A | * | 3/1999 | Spear et al. | 280/47.371 |
| 6,364,328 B1 | * | 4/2002 | Stahler, Sr. | 280/47.18 |
| 6,390,496 B1 | * | 5/2002 | Eicher | 280/653 |
| 6,682,084 B2 | * | 1/2004 | Webster et al. | 280/79.5 |
| 6,685,200 B1 | | 2/2004 | Giannoni et al. | |
| 6,742,790 B2 | * | 6/2004 | Seagraves et al. | 280/47.34 |
| 6,755,478 B2 | * | 6/2004 | Messinger-Rapport | 298/3 |
| 7,011,485 B2 | * | 3/2006 | Henry | 414/480 |
| 2002/0047251 A1 | * | 4/2002 | Simmons et al. | 280/659 |
| 2002/0195783 A1 | * | 12/2002 | Robinson | 280/47.31 |
| 2005/0134012 A1 | * | 6/2005 | Kan | 280/47.34 |

* cited by examiner

Primary Examiner—Paul N Dickson
Assistant Examiner—John R Olszewski
(74) Attorney, Agent, or Firm—McHale & Slavin, P.A.

(57) ABSTRACT

The purpose of this invention is to provide a material-moving device suitable for loading, unloading, and transporting at least one item thereon by a single person. The material-moving device includes a platform portion for holding at least one item thereon, at least two pairs of wheels rotatably attached to the platform portion in a manner that enables the front perimeter edge to pivot for easy loading and unloading the items onto the platform portion. The device also includes an elongated handle attached to the platform and an auxiliary handle movably attached to elongated handle in a manner effective to allow a single user to control the pivotal movement of the material-moving device while simultaneously gripping at least one item being loaded or unloaded onto said platform portion.

17 Claims, 5 Drawing Sheets

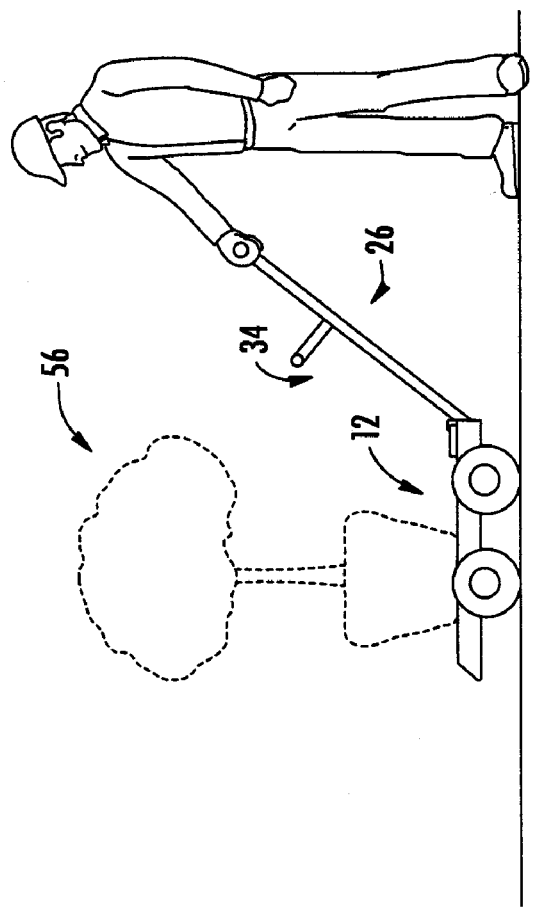
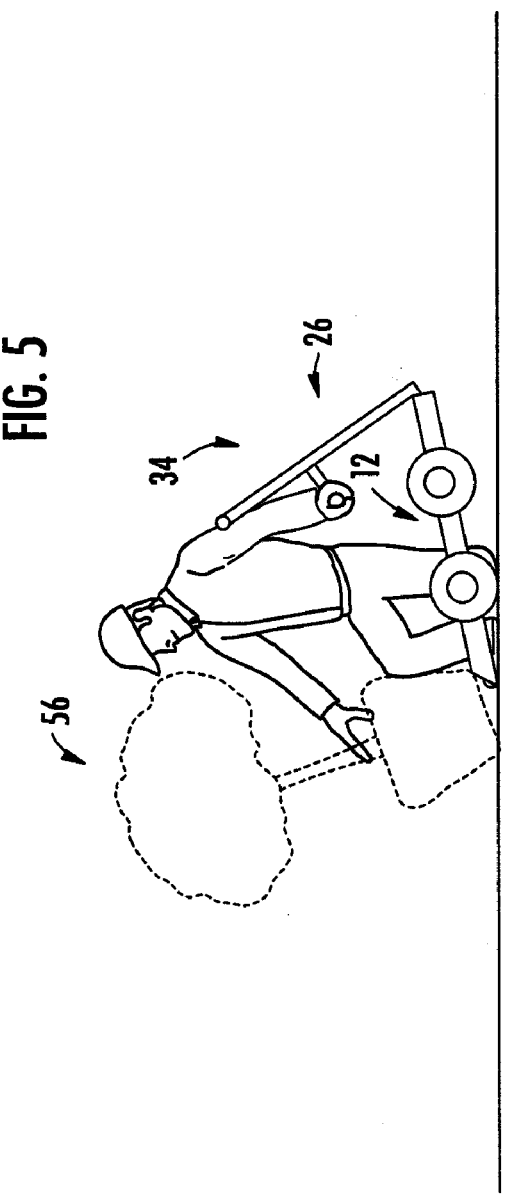

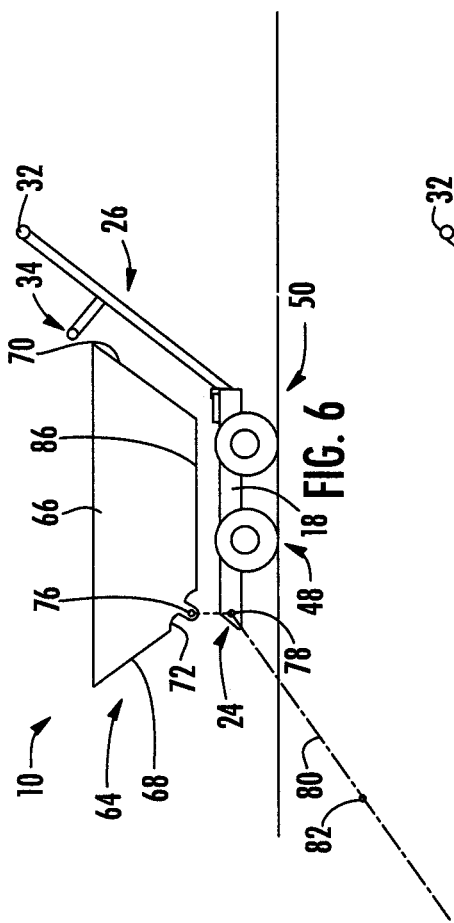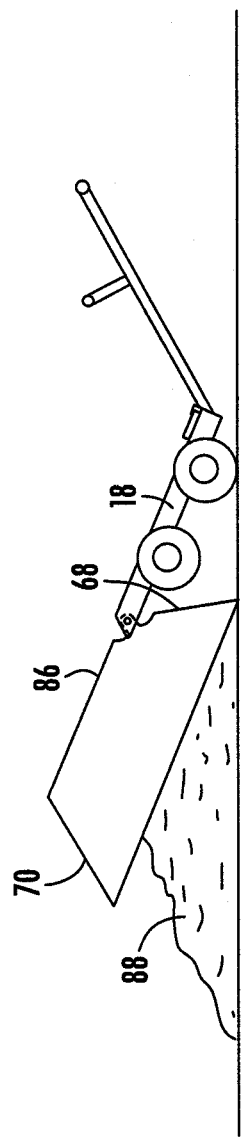

MATERIAL-HANDLING DEVICE

FIELD OF THE INVENTION

The invention generally relates to a material-handling device; particularly, to a sturdy and durable material-handling device designed so that items of significant weight may be safely moved by a single person.

BACKGROUND OF THE INVENTION

Material-moving devices, including carts, wagons, hand-trucks, and dollies have been used for years to transport loads which are often too heavy or cumbersome to carry by hand. The standard hand-truck has a L-shaped frame with wheels located at the vertex between a vertical handle and a flat horizontal platform. When in the vertical position, the user is often able to readily locate the platform under the item to be lifted. This platform, while providing relatively good leverage when tilting and lifting loads over the wheels, is not practical for transporting items longer than the length of the vertical handle. When high-profile items are loaded onto the platform, they are often placed directly in the way of the operator making the hand-truck difficult to maneuver safely. For example, in the nursery profession hand trucks are often used to transport potted plants; however, the operator often gets caught in the foliage of these larger plants. Moreover, tilting the load during transport can cause spillage or damage thereto.

Carts, wagons, and dollies usually consist of a level platform raised a predetermined distance off the ground depending on the design of the tires. This level surface is advantageous in that it is not tilted and thus, not prone to spillage. Moreover, these types of material-handling devices are not generally limited in the height of the item being moved. However, in order to load or unload heavier items more than one user must vertically lift the item onto the platform. Obviously heavy lifting of this sort can lead to bodily injuries (e.g., pulled back, muscle strain, etc.) In addition, the use of more than one person is an ineffective use of resources. Often these types of material-handling devices are rigidly fixed together for enhanced stability so that they afford little adjustability to accommodate various sized persons.

As a consequence of these aforementioned problems, it is an object of the present invention to provide a material-handling device that provides a single operator the ability to lift an item onto the platform of the device safely. Moreover, the present invention maintains the neutral postures of the back, shoulders, and knees of the user, thereby significantly reducing injury potential. In addition, the material-moving device of the present invention is designed to provide adjustability to accommodate persons of different heights and preferences (e.g., left- or right-handed user).

DESCRIPTION OF THE PRIOR ART

The prior art discloses numerous carts, hand-trucks and dollies designed for enhanced stability and portability. For example, U.S. Pat. No. 6,685,200 to Giannoni et al., describes a flat top carrier deck on a horizontal carrier deck. The deck includes a base plate, and at least one elevating gate. The base plate is preferably fabricated from a perforated sheet of material. Each elevating gate engages the base plate. Each elevating gate is either disposed in a retracted position or an extended position. Preferably, a handle clearance impression is formed in a first end of the base plate and a lift clearance impression is formed in a second end thereof.

U.S. Pat. No. 6,682,084 to Webster et al., describes a dolly for transporting material containers including a base having a pair of wheels attached thereto. A handle is removably attached to the base and has a seal and plug removal wrench fixedly attached near one end thereof. A second plug removal wrench is fixedly attached near the opposite end of the handle. A tilting lever is fixedly secured to the handle, whereby a portion of the material container is raised with the tilting lever and the base is positioned underneath the material container.

Similarly, U.S. Pat. No. 5,088,751 to Zint discloses a lawn or garden cart having a circular flanged frame providing support and retainment of a separable receptacle, such as a bucket or tub, used for the purpose of gardening and lawn care.

Such prior art devices, while working well, have not satisfied the needs of users to provide a device that allows a single operator the ability to load/unload a heavy item thereon while significantly reducing the potential for injury.

SUMMARY OF THE INVENTION

The instant invention is directed toward a robust and stable material-moving device suitable for loading and transporting at least one item thereon, single-handedly. The material-moving device includes a platform portion constructed and arranged to hold at least one item thereon. The platform portion having a substantially rectangular base panel defined by an upper surface, a lower surface and a perimeter, a pair of parallel side walls and a back wall extending upwardly from the base panel perimeter. The platform portion also includes a front perimeter edge located opposite the back wall and constructed and arranged for loading and unloading the items thereon.

Furthermore, the material-moving device of the present invention has a first and second pair of wheels. Each pair of wheels is rotatably attached to the platform portion in a manner which enables the front perimeter edge to pivot between a position where the upper surface of the platform is substantially level (parallel to the ground) and a position juxtaposed to the ground for easy loading and unloading thereon. An elongated handle having an upper end and a lower end is attached to the platform portion proximate the back wall. The upper end of the handle includes a steering grip for the user to push and pull the material-moving device along. The device also includes an auxiliary handle attached to the elongated handle in a manner effective to allow the single user to control the pivotal movement of the material-moving device while simultaneously gripping at least one item being loaded or unloaded onto the platform portion.

In accordance with another embodiment, the material-handling device may also include a removable material retaining portion so that the device may be used to transport loose material, such as, soil, sand, gravel, etc.

Accordingly, it is an objective of the instant invention to provide a material-handling device that due to its unique design produces a lifting force so that items of significant weight may be moved by a single person.

Still another objective of the present invention is to disclose a material-handling device including a material retaining portion which is capable of being unloaded with little effort by the user.

Another objective of the instant invention is to disclose a material-handling device designed to easily pass through standard garden gates and doors.

Yet another objective of the instant invention is to teach a material-handling device constructed from sturdy and chemically inert materials.

Another objective of the present invention is to provide an auxiliary handle that is reversibly transformable between a left- and right-handed position.

Yet still another objective of the present invention is to teach a material-handling device that is lightweight and economical to manufacture in that it composed of readily available components.

Still yet another objective of the instant invention is to disclose an adjustable auxiliary handle that allows the user to position the auxiliary handle to a comfortable height.

A further objective of the present invention is to provide a material-handling device that uses floatation tires to easily transport heavy items across uneven or rough terrain (stumps, curbs, etc.)

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof. It will be readily appreciated by those skilled in the art that the use of a material-handling device for the purpose of transporting items thereon is useful in the art.

BRIEF DESCRIPTION OF THE FIGURES

FIG. 4 is side view of the device of FIG. 1 illustrating a single person loading an item thereon;

FIG. 5 is a side view illustrating the item loaded onto the material-handling device;

FIG. 6 is an exploded side view of the device according to another embodiment illustrating the material retaining device for use thereon;

FIG. 7 is a side view of the device illustrating the material retaining device pivotally attached thereto; and FIG. 8 is the same side view seen in FIG. 7, illustrating the material retaining device dumping out the loose material therein.

DETAILED DESCRIPTION OF THE INVENTION

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
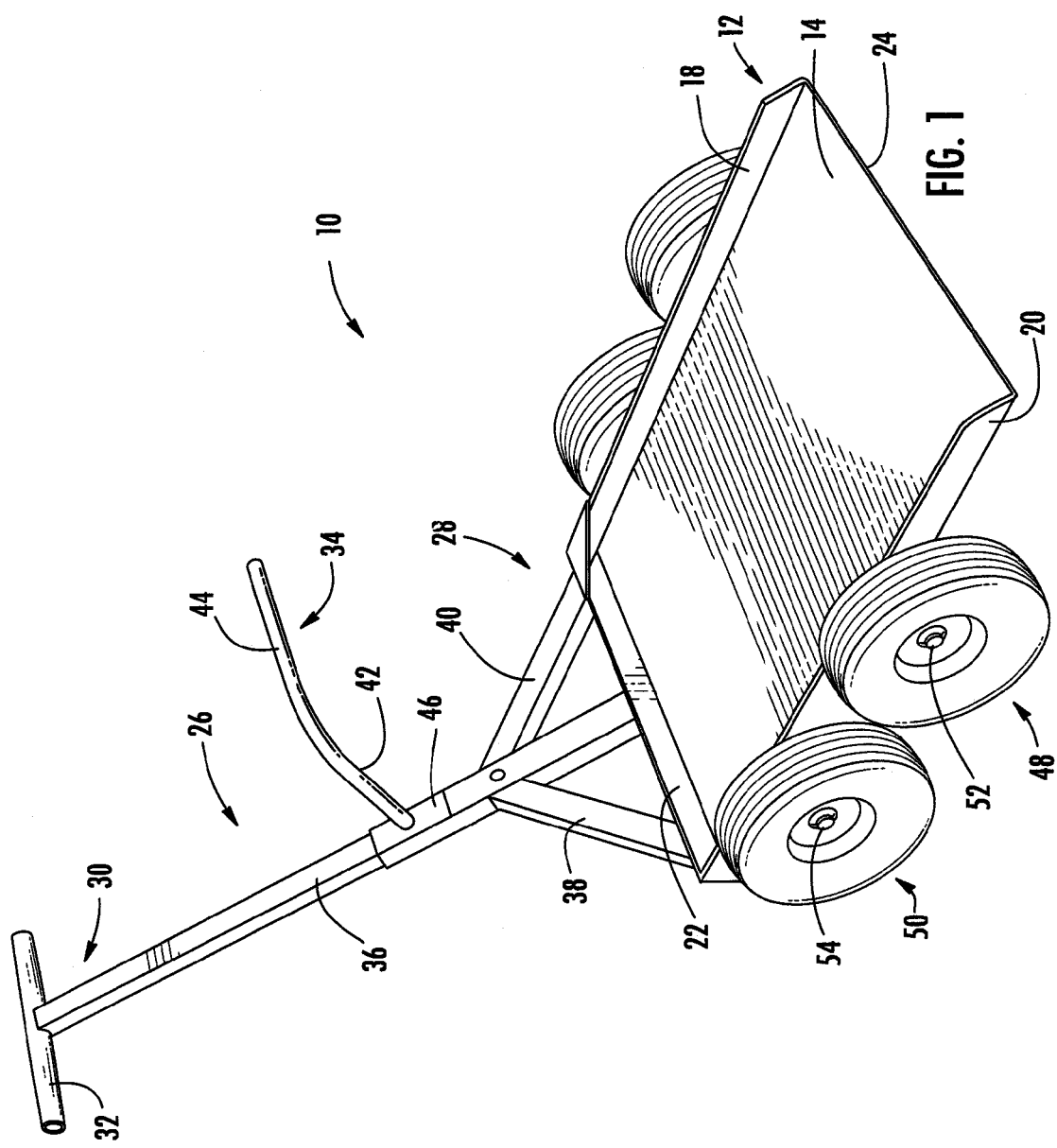
FIG. 1 is an upper perspective view of the material-handling device according to a preferred embodiment of the invention.

Referring now to FIGS. 1-8, wherein like elements are numbered consistently throughout, FIG. 1 illustrates one embodiment of the material-handling device according to the present invention, generally referenced herein as 10. The material-moving device of the present invention is constructed and arranged for loading, unloading, and transporting at least one item thereon by a single person in a safe manner. By way of an overview, the device includes a platform portion 12 having at least two pairs of wheels 48, 50 rotatably connected thereto and an elongated handle 26 having an auxiliary handle 34 attached to it which allows a single user to load/unload a heavy item onto the platform portion.

Specifically, the platform portion of the device includes a substantially rectangular base panel defined by an upper surface 14, a lower surface 16 and a pair of parallel side walls 18, 20 and a back wall 22. The side walls and back wall extend upwardly from the base panel perimeter. In addition, the platform portion includes a front perimeter edge 24 located on the side opposite the back wall. The front perimeter edge does not include any extending sidewall thereby allowing for easy loading and unloading the items thereon. Although not shown, the platform portion of the device may include perforations that allow the user to easily drain water and debris therefrom.

The material-handling device includes a first and second pair of wheels 48, 50 rotatably attached onto the platform portion at a location which enables the front perimeter edge to pivot between a position where the platform upper surface is substantially parallel to the ground (see FIG. 5), and a position juxtaposed to the ground (FIG. 4) which enables the user to slide items thereon, as discussed further below.

The platform portion has an elongated handle 26 rigidly attached thereto at a predetermined angle suitable for the user to push or pull the material-handling device. Specifically, the elongated handle comprises an upper end 30 and a lower end 28. The upper end includes a steering grip 32 for the user to hold onto when maneuvering the material-moving device. The lower end is rigidly attached to the platform portion by any suitable means of attachment. Additionally, the steering grip may include hand indentations (not shown) for a more comfortable and slip-free grip.

The elongated handle comprises an elongated shaft 36. Specifically, the elongated shaft is attached at the lower end to the back wall of the platform portion by any suitable fastening means. Although not required, the elongated shaft may be flanked on either side by a support member 38, 40 in a manner which provides enhanced rigidity and strength to the elongated shaft. The support members are fixedly secured to the shaft and the back wall of the platform by any means of securing deemed suitable. Although not limited thereto, the preferred length of the elongated handle from the first to the second end is about 44 inches long.

Figure 2:
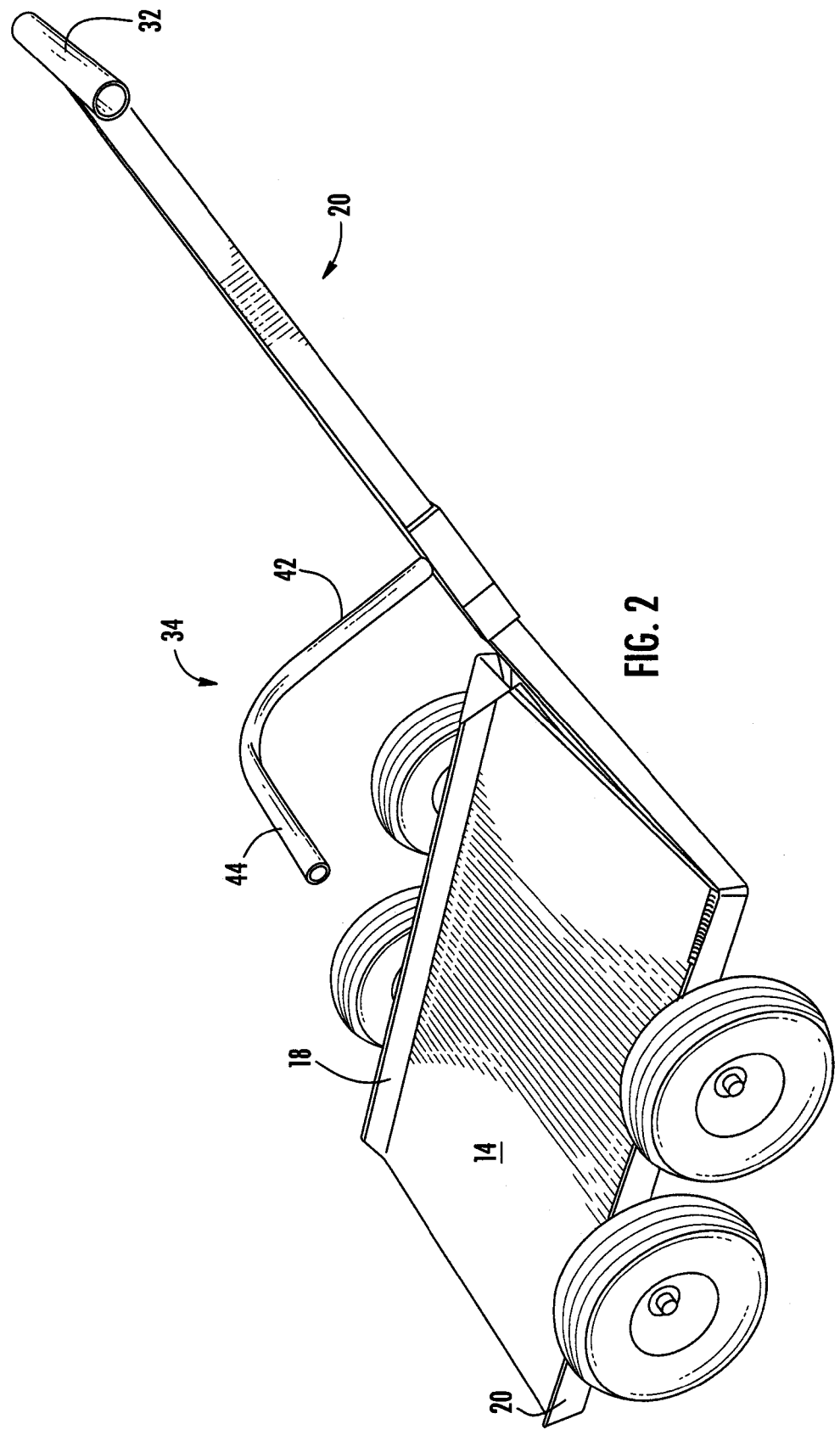
FIG. 2 is another upper perspective view of the material-handling device as seen from the side opposite FIG. 1.

The material-handling device includes an auxiliary handle 34 attached to the elongated handle in a manner effective to allow a single user to control the pivotal movement of the material-moving device while simultaneously gripping at least one item being loaded or unloaded onto the platform portion (see FIG. 5). As shown in FIGS. 1-2, the auxiliary handle comprises a first portion 42 which extends perpendicularly a predetermined distance from the elongated handle over the platform portion of the device. The first portion is integrally and perpendicularly connected to a second portion 44 which the user grips when loading and unloading the device, as discussed further below. It has been discovered by the present inventor, that the optimum length of the first portion of the auxiliary handle is about 12 inches long, and the preferred length of the second portion is about 13 inches long. These dimensions permit the average user the ability to readily grasp both the item being loaded and unloaded and the auxiliary handle simultaneously, while maintaining substantially neutral postures of the back, shoulders, and knees of the user. The maintenance of substantially neutral posture during the loading/unloading procedure significantly reduces the potential for injury.

According to a preferred embodiment, the first portion of the auxiliary handle includes a sleeve 46 designed to fit concentrically over the elongated shaft so that the auxiliary handle is able to telescope along the longitudinal axis of the elongated handle. In this manner the user is able to adjust the location of the auxiliary handle therealong to a height most comfortable for the user. Although not shown, the sleeve may include a threaded opening formed therethrough which the user can insert a fastening means that when tightened in the opening acts to frictionally engage the outer surface of the elongated shaft. Other means for fixedly attaching the sleeve relative to the handle are also contemplated herein.

Additionally, the auxiliary handle may be removably attached to the elongated handle such that the user is able to switch between left- and right-handed use. According to this embodiment, the elongated handle is removably attached to the platform portion by any removably fastening means (e.g., bolt, nut, etc.) As with the previous embodiment, the sleeve fits concentrically over the elongated shaft so that the auxiliary handle is able to telescope along the longitudinal axis of the elongated handle. When the elongated handle is removed from the platform, the user can slide the auxiliary handle off the lower end and merely flip it over and slide it back on so that the second portion of the auxiliary handle faces the other way. In this manner, a right-handed person like that shown FIGS. 4 and 5, may change the direction of the second portion to accommodate a left-handed person. Additionally, the second portion 44 of the auxiliary handle may include hand indentations (not shown) for a more comfortable and slip-free grip.

Figure 3:
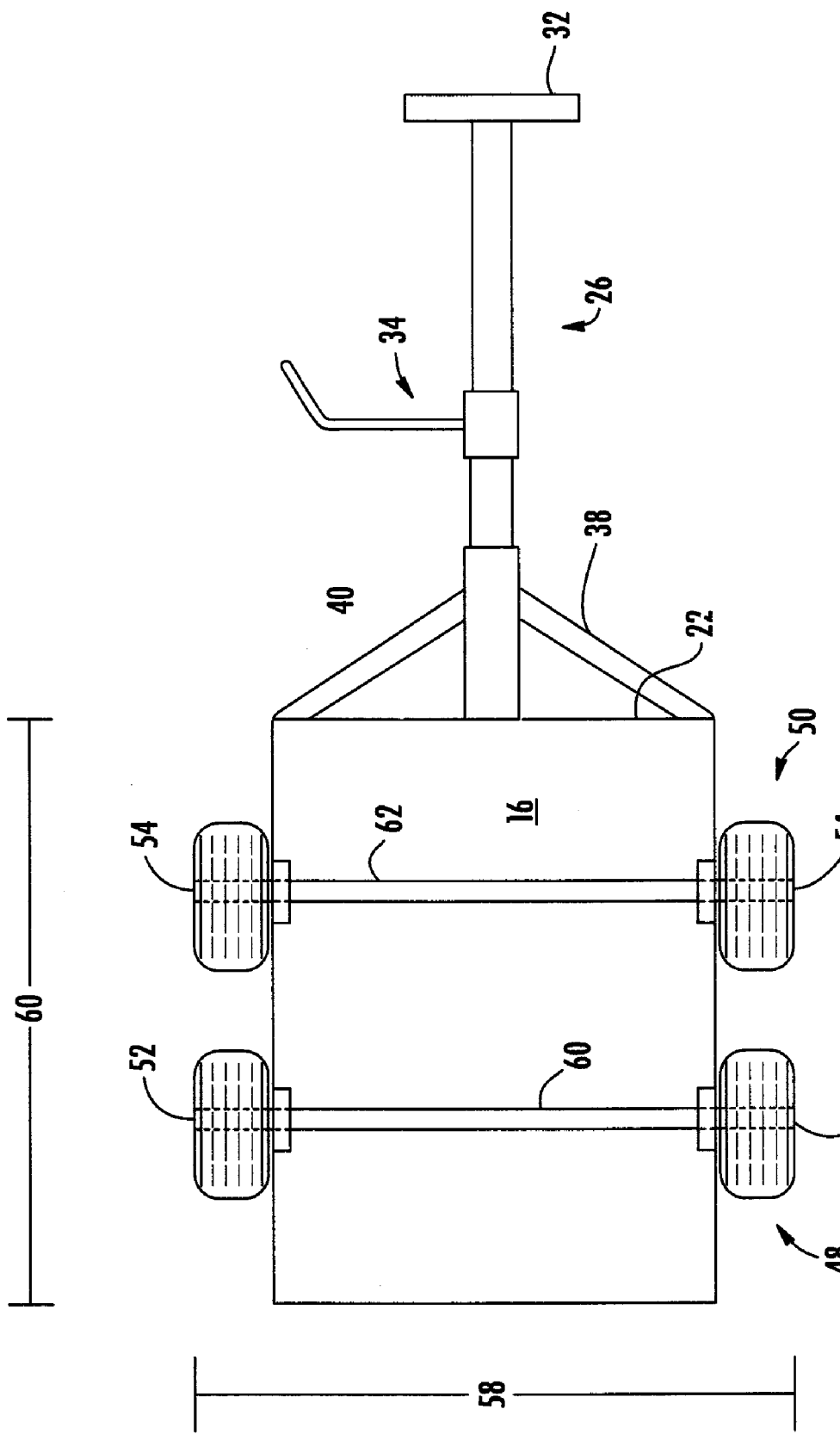
FIG. 3 is a bottom view of the device of FIG. 1.

As best seen FIG. 3, the platform portion of the present device also includes at least four wheels rotatably attached thereto. According to a preferred, albeit non-limiting embodiment, the instant device includes a first and second pair of all-terrain, or floating tires. Each wheel pair is rotatably attached to either side of an axle 60, 62 in any manner known in the art. It has been discovered that optimum distance of the hub (or center) 52 of the first pair of wheels should be about 13 inches from the front perimeter edge. This distance enables the user to employ the platform like a lever and exert leverage on the item by pivoting about the axis between the first pair of wheels (FIG. 4). According to a preferred embodiment, the hub (or center) 54 of the second pair of wheels are located about 26 inches from the front perimeter edge. This unique configuration has been found to produce the optimum force for lifting the item off the ground.

Floating tires, such as rubber pneumatic tires, are desired as they provide near-linear compression. That is, as the compressive load increases the total air volume reduces only a fraction of a percent. Pneumatic tires provide improved traction on uneven and rough terrain and do not tend to bounce as much as plastic tires do. These tires have been found to glide easily over curbs and stumps.

Referring to FIG. 3, it has been discovered by the present inventor, that the outermost width dimension 58 of material-handling device, including tires, should be at most about 34 inches to allow passage through standard garden gates and doors. Similarly, it has been determined that the optimum length dimension 60 of the platform base should be about 35 inches.

It should be appreciated by those skilled in the art that the attachment means of the above-mentioned device components (e.g., platform portion, elongated handle, auxiliary handle, etc.) may be accomplished by removable mechanical fasteners (bolts/nuts, etc.) or permanent such as by welding, brazing, rivets, although alternative means and methods are also possible.

According to a preferred embodiment, the components of the elongated handle, including the elongated shaft, and support members, are formed of hollow members having a substantially square cross-section. However, components having any cross-sectional shape (circular, rectangular, or the like) are with the purview of the present invention. Similarly, the cross-sectional shape of the auxiliary handle may be any shape desired. While the use of hollow members is preferred to produce a device with a low weight to load capacity ratio, solid members are also within the scope of the instant invention.

The method of using the material-handling device is described with respect to loading; however, it should be obvious that the steps to unload it are merely reversed. Referring now to FIGS. 4 and 5, the auxiliary handle is shown extending over the platform portion of the device. This configuration allows the user to move to a location where the person can both grip the item to be loaded, shown here as a tree 56. The item is tilted by the user just enough so that the user can, using the auxiliary handle, move the front edge of the platform under a substantial portion of the item's bottom surface. The weight of the item is placed on the front edge of the platform. Then, the weight is lifted by holding the item and pulling the auxiliary handle, using the length of the platform as a lever with the wheels acting as its fulcrum of leverage. In this manner a single person is able to control the pivotal movement of the device while simultaneously gripping at least one item being loaded or unloaded onto platform portion. Next, the user will employ the handle to slide the item on the upper surface of the platform until it is at least over the first pair of wheels. The loaded material-handling device is stable and easily maneuverable to any desired location by pushing or pulling the device by the elongated handle.

According to another embodiment of the present invention illustrated in FIGS. 6-8, the device may also include a removable material retaining portion 64. The material retaining portion includes a rectangular bottom panel 86 integrally connected to a pair of opposed parallel side walls 66 (only one side shown), a front wall 68, and a back wall 70 constructed and arranged to fit within the perimeter of the base panel 14 of the device's platform portion 12. In this way, the user can place the material retaining portion on top of the base panel of the device when the user needs to transport loose material therein (e.g., soil, gravel, etc.), similar to a wheelbarrow.

In accordance with a particularly preferred embodiment, the material retaining portion is pivotally attached to the sidewalls 18, 20 (only one side shown) of the platform portion at a location proximate to the front edge 24 of the platform, as shown in FIGS. 6-8. Although only one side is shown, each side of the material retaining portion includes a cut out 72 with an extending plate 76 located between the side walls and front wall of the material retaining portion. The extending plates and the platform sidewalls each include an aperture 76, 78 constructed and arranged to receive a rod-like member 80 therethrough. The rod-like member is secured in place between the extending plates by any means of attachment 82 deemed suitable (e.g., nuts, pins, etc.). In this manner, the material retaining portion is able to pivot along the axis of the rod (as indicated by arrow 84) between a position where the bottom panel of the material retaining portion resides on the base panel of the material-handling device (FIG. 7) and a dumping position where the bottom panel is substantially parallel to the ground (FIG. 8). It is hereby contemplated that other means of pivotally attaching the material retaining portion onto the platform of the device could be used without departing from the scope of the invention.

The novel configuration of the instant device in combination with the material retaining portion pivotally attached thereto allows the user to easily dump the material 88 contained therein without having to pivot the material retaining portion by hand. Thereby, reducing the incidence for user injury. In order to dump the material contained within the material retaining portion, the user merely pushes down on the elongated handle at the steering grip simultaneously causing the platform to tilt backward along the second pair tires 50 and the material retaining portion to pivot forward along the axis of the rod until the uppermost edges of the material retaining portion rest against the ground. To return the material retaining portion onto the base panel of the device, the user will pull the device backward and then push upward on the steering grip. This will cause the device to tilt along the first pair of tires 48 and force the uppermost edges of the material retaining portion acting against the ground to pivot along the axis of the rod-like member until the bottom panel of the material retaining portion rests against the base portion of the material-handling device.

As with the other components of the material-moving device, the platform portion, elongated handle, material retaining portion, and auxiliary handle are preferably constructed from an inert material which is durable and corrosion resistant. Some non-limiting embodiments of suitable inert material might include aluminum, steel, polymeric material (e.g., high density polyethylene (HDPE)), or combinations thereof.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A material-moving device suitable for loading, unloading, and transporting at least one item thereon by a single person, said material-moving device comprising:
   a platform portion for holding at least one item thereon, said platform portion including a substantially rectangular base panel defined by an upper surface, a lower surface, and a perimeter, a pair of parallel side walls and a back wall extending upwardly from said base panel perimeter, said platform portion including a front perimeter edge located opposite said back wall and constructed and arranged for loading and unloading said items thereon;
   a first and second pair of wheels, each said pair of wheels rotatably attached to said platform portion in a manner which enables the front perimeter edge to pivot between a position where said upper surface is substantially parallel to the ground and a position juxtaposed thereto;
   an elongated handle having an upper end and a lower end, said lower end is attached to said platform portion proximate said back wall, said upper end includes a steering grip for the user to maneuver said material-moving device; and
   an auxiliary handle attached to said elongated handle in a manner effective to allow a single user to control the pivotal movement of said material-moving device while simultaneously gripping at least one item being loaded or unloaded onto said platform portion and further attached to said elongated handle in a telescoping manner whereby the user is able to adjust the location of said auxiliary handle along said elongated handle.

2. The material-moving device of claim 1, wherein said auxiliary handle is removably attached to said elongated handle such that the user is able to switch between left-and right-handed use.

3. The material-moving device of claim 1, wherein the outmost width of cart is about 34 inches to allow passage through standard garden gates and doors.

4. The material-moving device of claim 1, wherein the length of said platform base is about 35 inches.

5. The material-moving device of claim 1, wherein said first pair of wheels contain a center, said center located about 13 inches from said front perimeter edge.

6. The material-moving device of claim 1, wherein said second pair of wheels contain a center, said center located about 26 inches from said front perimeter edge.

7. The material-moving device of claim 1, wherein said platform portion, said elongated handle and said auxiliary handle are constructed from an inert material selected from the group consisting essentially of; aluminum, steel, or polymeric material.

8. The material-moving device of claim 1, wherein said elongated handle is about 44 inches long.

9. The material-moving device of claim 1, wherein the length of said platform base is about 35 inches.

10. A material-moving device suitable for loading, unloading, and transporting at least one item thereon by a single person, said material-moving device comprising:
    a platform portion for holding at least one item thereon, said platform portion including a substantially rectangular base panel defined by an upper surface, a lower surface, and a perimeter, a pair of parallel side walls and a back wall extending upwardly from said base panel perimeter, said platform portion including a front perimeter edge located opposite said back wall and constructed and arranged for loading and unloading said items thereon;
    a first and second pair of wheels, each said pair of wheels rotatably attached to said platform portion in a manner which enables the front perimeter edge to pivot between a position where said upper surface is substantially parallel to the ground and a position juxtaposed thereto;
    an elongated handle having an upper end and a lower end, said lower end is attached to said platform portion proximate said back wall, said upper end includes a steering grip for the user to maneuver said material-moving device;

an auxiliary handle attached to said elongated handle in a manner effective to allow a single user to control the pivotal movement of said material-moving device while simultaneously gripping at least one item being loaded or unloaded onto said platform portion; and a material retaining portion defined by a substantially rectangular bottom panel integrally connected to a pair of parallel side walls, a front wall, and a back wall extending upwardly from said bottom panel perimeter of said material-moving device, said material retaining portion is constructed and arranged to reside within said base panel perimeter of said device.

11. The material-moving device of claim 10, wherein said auxiliary handle is attached to said elongated handle in a telescoping manner whereby the user is able to adjust the location of said auxiliary handle along said elongated handle.

12. The material-moving device of claim 10, wherein said material retaining portion is pivotally attached to the sidewalls of said platform portion at a location proximate to said front perimeter edge of said platform, said material retaining portion is constructed and arranged to pivot between a position where said bottom panel resides on said base panel of said device and a dumping position where said bottom panel is parallel to said ground.

13. The material-moving device of claim 10, wherein the outmost width of cart is about 34 inches to allow passage through standard garden gates and doors.

14. The material-moving device of claim 10, wherein said first pair of wheels contain a center, said center located about 13 inches from said front perimeter edge.

15. The material-moving device of claim 10, wherein said second pair of wheels contain a center, said center located about 26 inches from said front perimeter edge.

16. The material-moving device of claim 10, wherein said platform portion, said elongated handle and said auxiliary handle are constructed from an inert material selected from the group consisting essentially of; aluminum, steel, or polymeric material.

17. The material-moving device of claim 10, wherein said elongated handle is about 44 inches long.

* * * * *